(12) United States Patent
Satyanarayana et al.

(10) Patent No.: US 11,847,005 B2
(45) Date of Patent: Dec. 19, 2023

(54) COMPACT USB-C BASED MULTIPORT POWER SUPPLY DEVICE AND METHOD OF OPERATION THEREOF

(71) Applicant: SILICONCH SYSTEMS PVT LTD, Karnataka (IN)

(72) Inventors: Burle Naga Satyanarayana, Pradesh (IN); Rakesh Kumar Polasa, Karnataka (IN); Shubham Paliwal, Uttar Pradesh (IN); Robin Chalana, Rajasthan (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 0 days.

(21) Appl. No.: 17/531,642

(22) Filed: Nov. 19, 2021

(65) Prior Publication Data

US 2022/0253116 A1    Aug. 11, 2022

(30) Foreign Application Priority Data

Feb. 11, 2021    (IN) .............................. 202141005967

(51) Int. Cl.
*G06F 1/26*    (2006.01)
*G06F 13/42*   (2006.01)
(Continued)

(52) U.S. Cl.
CPC ............ *G06F 1/266* (2013.01); *G06F 13/385* (2013.01); *G06F 13/4068* (2013.01); *G06F 13/4282* (2013.01); *G06F 2213/0042* (2013.01)

(58) Field of Classification Search
CPC .......... G06F 1/189; G06F 1/263; G06F 1/266; G06F 11/3051; G06F 13/385;
(Continued)

(56) References Cited

U.S. PATENT DOCUMENTS 9,914,548 B1 *   3/2018  Vadillo ..................... H02J 7/00
11,054,446 B1 *  7/2021  Satyanarayana .. H02M 3/33561
(Continued)

OTHER PUBLICATIONS

"USB Type-C DFP with Charging Port Controller and Integrated 36V 3.5A Synchronous Buck Converter". RTQ2116C-QA. Jun. 2020. Richtek Technology Corporation. (Year: 2020).*
(Continued)

*Primary Examiner* — Thomas J. Cleary
(74) *Attorney, Agent, or Firm* — Procopio, Cory, Hargreaves & Savitch LLP

(57) ABSTRACT

A multiport universal serial bus (USB)-C based power supply device including a USB type-C port configured to supply power to a connected type-C external device, at least one USB type-A port configured to supply power to at least one connected type-A external sink device, a configurable power source and a controller operatively coupled with the configurable power source, the USB type-C port and at least one of the USB type-A port. The controller is configured to generate, based on the generated type-C and type-A power profile, at least one of a digital communication signal and a feedback control signal, which correspond to a power value to be supplied, based on the generated power profile, to the type-C port and the at least one type-A port respectively. Operation of the multiport USB-C based power supply device by a single controller facilitates compact construction of the multiport USB-C based power supply device.

10 Claims, 8 Drawing Sheets

(51) Int. Cl.
*G06F 13/38* (2006.01)
*G06F 13/40* (2006.01)

(58) Field of Classification Search
CPC ............ G06F 13/4063; G06F 13/4068; G06F 13/4282; G06F 2213/0042
See application file for complete search history.

(56) References Cited

U.S. PATENT DOCUMENTS

| | | | | |
|---|---|---|---|---|
| 2011/0068626 | A1* | 3/2011 | Terlizzi | H02J 1/08 307/32 |
| 2011/0093624 | A1* | 4/2011 | Crumlin | H01R 13/7039 710/16 |
| 2014/0122909 | A1* | 5/2014 | Hawawini | H02J 5/00 713/310 |
| 2014/0325245 | A1* | 10/2014 | Santini | H02J 1/14 713/300 |
| 2016/0352101 | A1* | 12/2016 | Koo | H02J 1/12 |
| 2017/0005494 | A1* | 1/2017 | Li | H02J 7/0013 |
| 2018/0159341 | A1* | 6/2018 | Kadam | H02J 50/80 |
| 2018/0323626 | A1* | 11/2018 | Suen | B60L 1/006 |
| 2019/0073012 | A1* | 3/2019 | Sultenfuss | H02J 7/0068 |
| 2019/0267817 | A1* | 8/2019 | Weissinger | H02J 7/0013 |
| 2019/0288532 | A1* | 9/2019 | Mattos | H02J 7/0034 |
| 2021/0167623 | A1* | 6/2021 | Sanghvi | H02J 7/0013 |
| 2021/0191486 | A1* | 6/2021 | Chen | G06F 1/263 |
| 2021/0208654 | A1* | 7/2021 | Bhattacharjee | H02J 1/106 |
| 2021/0320514 | A1* | 10/2021 | Polasa | H02M 3/1563 |
| 2022/0102992 | A1* | 3/2022 | Chen | H02J 7/0044 |
| 2022/0137690 | A1* | 5/2022 | Wang | G06F 1/28 713/300 |
| 2022/0171443 | A1* | 6/2022 | Kumar | H02J 7/0042 |
| 2022/0221921 | A1* | 7/2022 | Bhagavathula | G06F 1/266 |
| 2022/0302846 | A1* | 9/2022 | Liu | H02M 3/158 |

OTHER PUBLICATIONS

"GPIO Expander". Sep. 2010. NXP Semiconductors N.V. (Year: 2010).*
Universal Serial Bus Type-C Cable and Connector Specification Release 2.0, USB 3.0 Promoter Group, Aug. 2019 (373 pages).
Universal Serial Bus Power Delivery Specification, Revision 3.0, Version 2.0, Aug. 29, 2019 (657 pages).

* cited by examiner

--Prior Art--

--Prior Art--

COMPACT USB-C BASED MULTIPORT POWER SUPPLY DEVICE AND METHOD OF OPERATION THEREOF

CROSS REFERENCE TO RELATED APPLICATIONS

This Paris Convention patent application claims benefit under 35 U.S.C. § 119 and claims priority to Indian Patent Application No. IN 202141005967, filed on Feb. 11, 2021, titled "A COMPACT USB-C BASED MULTIPORT POWER SUPPLY DEVICE AND METHOD OF OPERATION THEREOF", the content of which is incorporated herein in its entirety by reference for all purposes.

TECHNICAL FIELD

The present disclosure relates, in general, to power delivery through a universal serial bus (USB) port of USB-C based power supply device. In particular, the present disclosure relates to power delivery in through two or more USB ports of a USB-C based power supply device, which includes at least one USB type-A port and a single USB type-C port.

BACKGROUND

Background description includes information that may be useful in understanding the present invention. It is not an admission that any of the information provided herein is prior art or relevant to the presently claimed invention, or that any publication specifically or implicitly referenced is prior art.

A conventional multiport universal serial bus (USB)-C based power supply device, also referred to as charger or adapter, can include one type-C port and one or more type-A ports. Power delivery through the ports is governed by protocols such as universal serial bus—power delivery (USB-PD), Quick Charge (QC) 4.0 etc. for type-C and QC 2.0, QC 3.0 and the like for type-A. To comply with the protocols, the devices are generally provided with at least one controller for each type of port, i.e., at least one type-C controller and at least one type-A controller, wherein two controllers in single IC Package need to have CC1, CC2, D+, and D-signals for Type-C port and another D+ and D− signals for Type-A port. The use of two or more controllers increases the complexity of the device, resulting in requirement of complex manufacturing techniques, which increase cost of the devices. Further, a higher quantity of raw material is required, which further increases cost, while also making the device bulky.

There is, therefore, a requirement in the art for a multiport USB-C based power supply device including type-C and type-A ports that is compact and economical, while also complying with various protocols for supply of power through respective ports.

SUMMARY

A general object of the present disclosure is to provide a multiport USB-C based power supply device which is intended for single Type-C port and can be used for controlling power supply through multiple USB ports provided on the device.

Another object of the present disclosure is to provide a USB-C based power supply device that includes a single type-C port and one or more type-A ports.

Another object of the present disclosure is to provide a USB-C based power supply device in which the same controller may be used for controlling power supply to Type-C port such that type-C controller is modified to supply power to one or more Type-A ports, without the need for additional controllers.

Another object of the present disclosure is to provide a multiport USB-C based power supply device that is compact and economical.

The present disclosure relates, in general, to power delivery through a universal serial bus (USB) port of USB-C based power supply device. In particular, the present disclosure relates to power delivery in through two or more USB ports of a USB-C based power supply device, which includes one USB type-C port and at least one USB type-A port.

In an aspect, the present disclosure provides a multiport universal serial bus (USB)-C based power supply device, which includes: one USB type-C port configured to supply power to a connected type-C external sink device, at least one USB type-A port configured to supply power to at least one connected type-A external sink device, a configurable power source operable on receipt of at least one of a digital communication signal and a feedback control signal, adapted for provision of type-C VBUS and type-A VBUS to a type-C power supply pin and a type-A power supply pin respectively; and a controller operatively coupled with the configurable power source, a DC-DC power converter, the USB type-C port and at least one of the USB type-A port. The type-C port can include: a type-C power supply pin corresponding to type-C connector VBUS adapted for supplying type-C power to the respective connected type-C external device; and a first set of configuration channel pins (CC pins) adapted for power negotiation with the respective connected type-C external device. Each of the type-A port can include: a type-A power supply pin corresponding to a type-A VBUS adapted for supplying type-A power to the respective connected type-A external sink device; and a first set of data terminal pins (D+/D− pins) including a pair of positive terminal pin (DP) and negative terminal pin (DM), wherein the first set of data terminal pins is adapted for power negotiation with the respective connected type-A external sink device. The configurable power source may be operable on receipt of at least one of the digital communication signal and the feedback control signal, adapted for provision of type-C VBUS and type-A VBUS to the type-C power supply pin and the type-A power supply pin respectively. The controller can include a processor operatively coupled with a memory, the memory storing instruction executable by the processor to: receive, from the first set of configuration channel pins (CC) pins of the type-C port, using a second set of configuration channel (CC channel) of the controller, a first information pertaining to power negotiation with the respective connected type-C external sink device to generate a type-C power profile for the connected type-C external sink device; receive, from the first set of data terminal pins (D+/D− pins) of the at least one type-A port, using a second set of data terminal pins (D+/D− channel) of the controller, a second information pertaining to power negotiation with the respective connected external sink type-A device to generate a type-A power profile for the at least one connected type-A external sink device. The controller is configured to generate, based on the generated type-C power profile, at least one of the digital communication signal and the feedback control signal to be sent to the configurable power source. The controller may be configured to generate, based on the generated type-A power profile, the digital communication signal and the feedback control signal to be sent to the DC-DC power converter. In an embodiment, at least one of the digital communication signal and the feedback control signal correspond to a power value to be supplied to the type-C port and the at least one type-A port respectively, and wherein operation of the multiport USB-C based power supply device by a single controller facilitates compact construction of the multiport USB-C based power supply device.

In an embodiment, the configurable power source can be adapted to, based on the received at least one of the digital communication signal and the feedback control signal, supply corresponding power to type-C VBUS and type-A VBUS respectively.

In another embodiment, the device can include one or more PMIC chips that are configured to control power value of type-C VBUS and type-A VBUS to the type-C port and the type-A port, respectively. In another embodiment, the device can include PMIC chip(s) in the AC-DC converter and DC-DC power converter.

In an exemplary embodiment, the configurable power source for type-C port can be generated from a secondary of AC-DC converter or a DC-DC power converter.

In another exemplary embodiment, the configurable power source for type-A port can be a DC-DC power converter.

In another embodiment, the type-C port can include data terminals (D+/D− pins), and wherein the D+ and D− pins are shorted such that the second set of data terminal pins (D+/D− channel) of the controller is used only for communication with the first set of data terminal pins (D+/D−) pins of the at least one type-A port.

In an embodiment, when the multiport universal serial bus (USB)-C based power supply device includes only one type-A port, the type-A port can include a first set of data terminals (D+/D− pins), and wherein the D+ and D− pins are directly connected to the second set of data terminal (D+/D− channel) of the controller.

In an embodiment, when the multiport universal serial bus (USB)-C based power supply device includes plurality of the type-A ports, if any one of the of type-A port is connected to a sink device, the first set of data terminal (D+/D− pins) signals of the respective connected type-A port is received by the second set of data terminal (D+/D− channel) of the controller using Analog Multiplexer.

In an embodiment, when the multiport universal serial bus (USB)-C based power supply device includes plurality of the type-A ports, if multiple type-A ports are connected to a sink device, the first set of data terminals (D+/D− pins) of a first type-A port (selected from the multiple type-A ports) is received by the second set of data terminal (D+/D− channel) of controller using Analog Multiplexer. For all other connected type-A ports, the first set of data terminals (D+/D− pins) are shorted with respective DPDM switches, wherein, the type-A VBUS switches are open when the respective type-A ports are unconnected.

In an embodiment, when the multiport universal serial bus (USB)-C based power supply device includes plurality of the type-A ports, at least one detection pin (DET) is provided on each type-A port such that the power supply to at least one of the plurality of the type-A ports is enabled based on generation of a detection signal received by the at least one detection pin (DET).

In an embodiment, if at least one of the plurality of type-A ports is connected to a sink device, the detection signal is received by the controller using general purpose input-output (GPIO) expander.

In an embodiment, based on the detection signal, an analog multiplexer connected to the controller enables to establish a connection between the second set of data terminal pins of the controller and the first set of data terminal pins of the at least one type-A port by controlling a VBUS switch connected to each type-A port, wherein upon receipt of the detection signal from a single port of the plurality of ports, the single port is supplied with power as per the power profile of the type-A port, wherein upon receipt of the detection signal from multiple type-A ports of the plurality of ports, a first port selected from the multiple type-A ports, having a pre-determined power profile, is enabled power supply at limited default value of 5V DC in BC1.2 configuration, followed by which power is supplied to another of the multiple type-A ports, at the default value of power 5V DC in BC1.2 configuration.

In an aspect, the present disclosure provides a method for operation of the multiport universal serial bus (USB)-C based power supply device, the method including: receiving, at the controller, from the CC pins through the Configuration channel (CC channel), a first information pertaining to power negotiation with a respective connected type-C external sink device to generate a type-C power profile for the connected type-C device; receiving, at the controller, from the D+ and D− pins, through a data channel (D+ and D− channel), a second information pertaining to power negotiation with the respective connected type-A external sink device to generate a type-A power profile for the connected type-A external sink device; generating, at the controller, based on the generated type-C power profile and type-A power profile, at least one of a digital communication signal and a feedback control signal to the configurable power source and DC-DC power converter to generate required values of type-C VBUS and type-A VBUS respectively; and operating, through the controller, the configurable power supply on receipt of at least one of the digital communication signal and the feedback control signal to a configurable power source and to a DC-DC power converter, to provide corresponding required values of the type-C VBUS and the type-A VBUS to the type-C port and the type-A port respectively. Operation of the multiport USB-C based power supply device by a single controller facilitates compact construction of the multiport USB-C based power supply device.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1A:
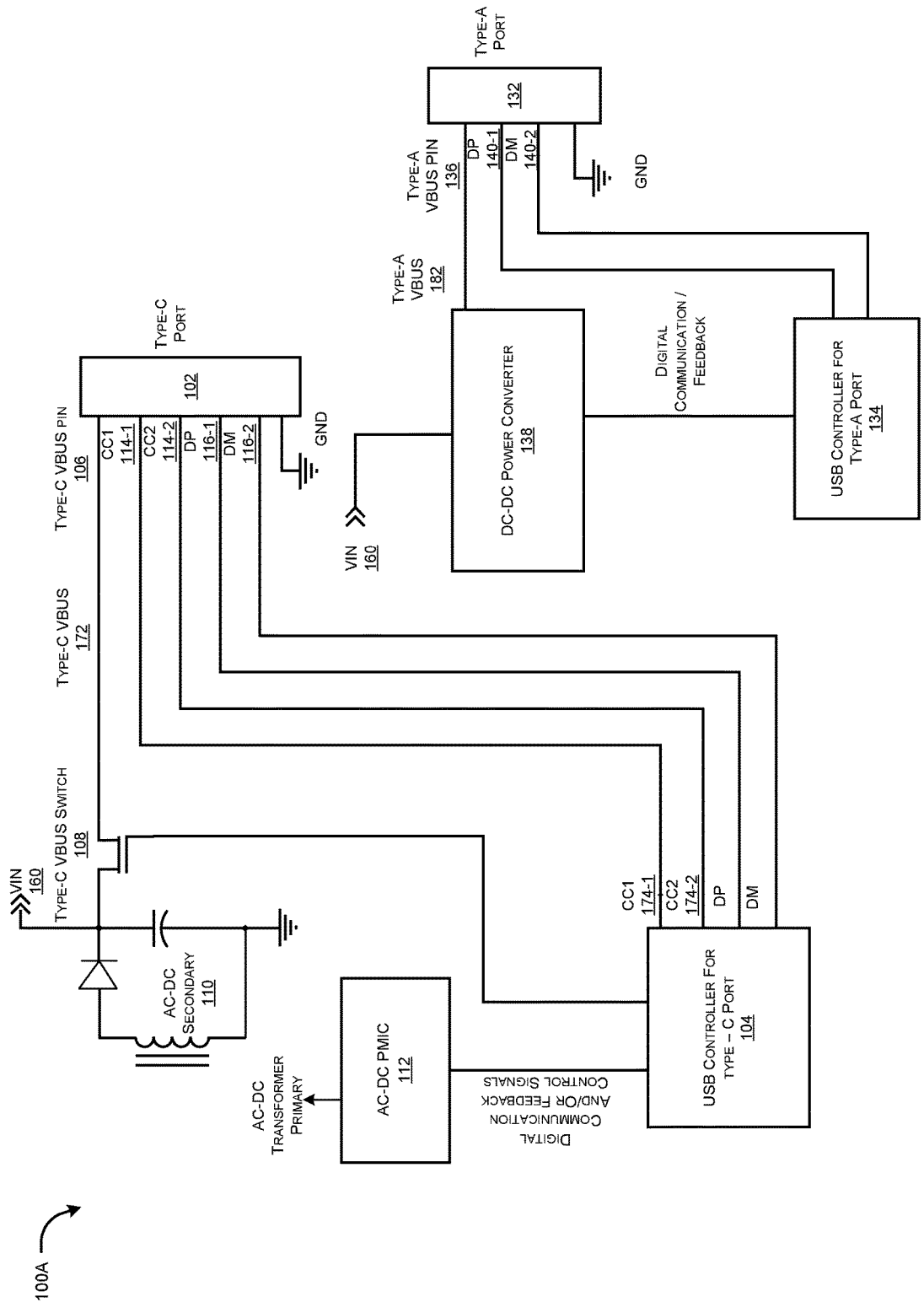
FIG. 1A illustrates a schematic representation of a conventional multiport universal serial bus (USB)-C based power supply device, where the device includes USB type-A and USB type-C ports.

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

In an aspect, the present disclosure provides a multiport universal serial bus (USB)-C based power supply device, which includes: one USB type-C port configured to supply power to a connected type-C external sink device, at least one USB type-A port configured to supply power to at least one connected type-A external sink device, a configurable power source operable on receipt of at least one of a digital communication signal and a feedback control signal, adapted for provision of type-C VBUS and type-A VBUS to a type-C power supply pin and a type-A power supply pin respectively; and a controller operatively coupled with the configurable power source and DC-DC power converter, the USB type-C port and at least one of the USB type-A port. The type-C port can include: the type-C power supply pin corresponding to type-C connector VBUS adapted for supplying type-C power to the respective connected type-C external sink device; and a first set of configuration channel pins (CC pins) adapted for power negotiation with the respective connected type-C external sink device. Each of the type-A port can include: the type-A power supply pin corresponding to a type-A VBUS adapted for supplying type-A power to the respective connected type-A external sink device; and first set of data terminal pins (D+/D− pins) comprising a pair of positive terminal pin (DP) and negative terminal pin (DM), wherein the first set of data terminal pins is adapted for power negotiation with the respective connected type-A external sink device. The configurable power source may be operable on receipt of the at least one of a digital communication signal and a feedback control signal to the configurable power source and DC-DC power converter, adapted for provision of type-C VBUS and type-A VBUS to the type-C power supply pin and the type-A power supply pin respectively.

The controller may be operatively coupled with the configurable power source and DC-DC power converter, the one USB type-C port and at least one USB type-A port, wherein the controller can include a processor operatively coupled with a memory, the memory storing instruction executable by the processor to: receive, from the first set of data terminal pins (D+/D−) pins of the at least one type-A port, using a second set of data terminal pins (D+/D− channel) of the controller, a second information pertaining to power negotiation with the respective connected type-A device to generate a type-A power profile for the at least one connected type-A device, wherein the controller is configured to generate, based on the generated type-C power profile, of the digital communication and/or feedback control signals to be sent to the configurable power source. The controller is configured to generate, based on the generated type-A power profile, the digital communication and/or feedback control signals to be sent to the DC-DC power converter. In an embodiment, at least one of the digital communication signal and the feedback control signal corresponds to a power value to be supplied, to the type-C port and the at least one type-A port respectively, and wherein operation of the multiport USB-C based power supply device by a single controller facilitates compact construction of the multiport USB-C based power supply device.

FIG. 1A illustrates a schematic representation of a conventional multiport universal serial bus (USB)-C based power supply device, where the device includes USB type-A and USB type-C ports. The device 100A can include: a USB type-C port 102, power delivered through which can be controlled by a type-C USB controller 104; and a USB type-A port 132, power delivered through which can be controlled by a type-A USB controller 134.

Referring to FIG. 1A, an input voltage VIN 160 supply power is provided to both the USB type-C port 102 and DC-DC power converter 138.

In the case of the USB type-C port 102, type-C VBUS 172 is supplied to a type-C VBUS pin 106 on the type-C port 102, through a switch (MOSFET) after passing through an AC-DC converter 110. The type-C VBUS 172 is regulated by the AC-DC converter 110 in conjunction with a power management chip (PMIC) 112. The type-C port 102 also includes Configuration channel pins CC1 114-1 and CC2 114-2 (herein, also collectively referred to as CC pins 114), which are responsible for power negotiation with any external sink device (not shown in figure) that is connected to the type-C port 102. The power negotiation can yield a power profile required for the external device, that is to be provided by the type-C VBUS 172. Communication regarding the power profile can occur between the type-C port 102 and the type-C controller 104 through CC1 channel 174-1 or CC2 channel 174-2 (hereinafter, also collectively referred to as CC channel 174). Digital communication and/or feedback control signals pertaining to the power profile then can occur between the type-C controller 104 and the PMIC 112 to provide the type-C VBUS 172 as per the required power profile. Additionally, the type-C port 102 may also include D+(DP) 116-1 and D− (DM) 116-2 pins. The required power profiles for the external sink device connected to type-C port 102 can occur through negotiation through the CC 114 using standardised protocols such as USB-PD, quick charge (QC) 4.0 and the like. The required power profiles for the external sink device connected to type-C port 102 can also occur through signalling on D+(DP) 116-1 and D− (DM) 116-2 pins depending on the sink type using protocols such as battery charging (BC) 1.2, QC 2.0, QC3.0 and the like.

In case of the USB type-A port 132, type-A VBUS 182 is supplied to a type-A VBUS pin 136 on the type-A port 132 from a DC-DC power converter 138, which, in turn, receives the VIN 160. The type-A port 132 also includes D+(DP) 140-1 and D− (DM) 140-2 pins (herein, also collectively referred to as D+/D− channel 140), which are responsible for power negotiation with any external sink device (not shown in figure) that is connected to the type-A port 132. The power negotiation can yield a power profile required for the external sink device, that is to be provided by the type-A VBUS 182. Communication regarding the power profile can occur between the type-A port 132 and the type-A controller 134 through the DP channel 140-1 and DM channel 140-2. Digital communication and/or feedback control signals pertaining to the power profile then occur between the type-A controller 134 and the DC-DC power converter 138 to provide type-A VBUS 182 as per the required power profile. The required power profiles for the external sink device connected to type-A port 132 can occur through negotiation through the DP 140-1 and DM 140-2 pins using standardised protocols such as QC 2.0, QC 3.0 and the like.

Conventionally, power delivery through a device 100 described above, which includes a combination of type-C and type-A ports requires at least one type-C controller and one type-A controller respectively to effect power delivery through the ports. The use of two controllers not only increases complexity of the control circuit of the device 100, but also the need for higher number of components translates to increased cost of the USB-C based power supply device 100.

Figure 1B:
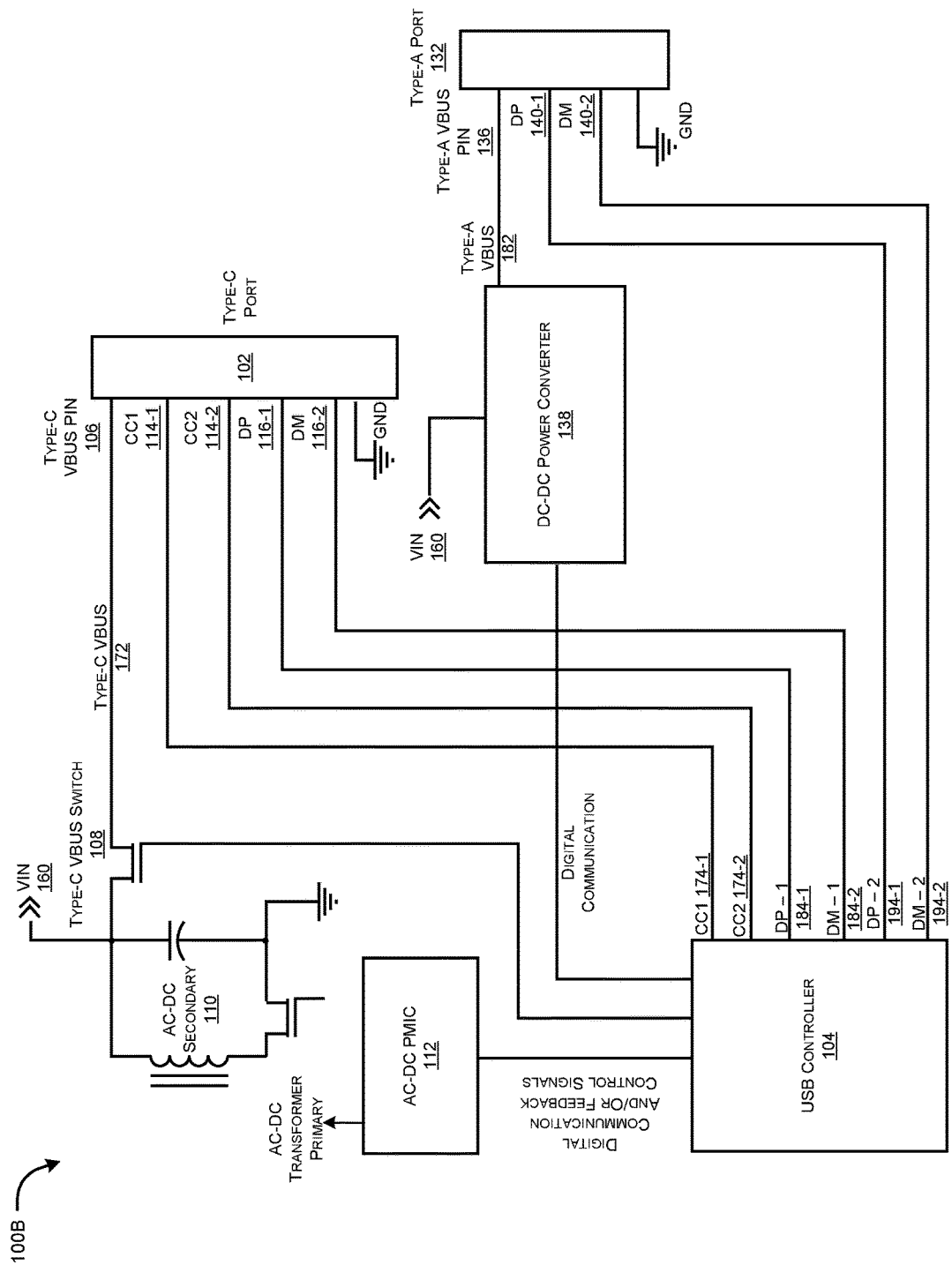
FIG. 1B illustrates a schematic representation of a conventional multiport universal serial bus (USB)-C based power supply device including one USB type-C port and one type-A port, which includes a single controller.

FIG. 1B illustrates a schematic representation of another conventional multiport universal serial bus (USB)-C based power supply device 100B including USB type-A and USB type-C ports, which include a single controller 104. The device 100B can include: a USB type-C port 102, power delivered through which can be controlled by a USB controller 104; and a USB type-A port 132 in which the power delivered through the port 132 can also be controlled by the same USB controller 104.

Referring to FIG. 1B, an input voltage VIN 160 supply power is provided to both the USB type-C port 102 and DC-DC power converter 138. In the case of the USB type-C port 102, type-C VBUS 172 is supplied to a type-C VBUS pin 106 on the type-C port 102, through a switch (MOSFET) after passing through an AC-DC converter 110. The type-C VBUS 172 is regulated by the AC-DC converter r 110 in conjunction with a power management chip (PMIC) 112. The type-C port 102 also includes Configuration channel pins CC1 114-1 and CC2 114-2 (hereinafter, also collectively referred to as CC pins 114), which are responsible for power negotiation with any external sink device (not shown in figure) that is connected to the type-C port 102. The power negotiation can yield a power profile required for the external device, that is to be provided by the type-C VBUS 172. Communication regarding the power profile occur between the type-C port 102 and the USB controller 104 through CC1 channel 174-1 or CC2 channel 174-2 (herein, also collectively referred to as CC channel 174) respectively. Digital communication and/or feedback control signals pertaining to the power profile then occur between the type-C controller 104 and the PMIC 112 to provide the type-C VBUS 172 as per required power profile. Additionally, the type-C port 102 may also include D+(DP) 116-1 and D− (DM) 116-2 pins, wherein communication regarding power profile occur between the type-C port 102 and USB controller 104 may occur through DP channel (DP-1) 184-1 and DM (DM-1) channel 184-2 (herein, also collectively referred to as D+/D− channel 184). The required power profiles for the external sink device connected to type-C port 102 occurs through negotiation through the CC 114 using standardised protocols such as USB-PD, QC 4.0 and the like. The required power profiles for the external sink device connected to type-C port 102 can also occur through signalling on D+(DP) 116-1 and D− (DM) 116-2 pins depending on the sink type using protocols such as BC1.2, QC2.0, QC3.0 and the like.

In the case of the USB type-A port 132, type-A VBUS 182 is supplied to a type-A VBUS pin 136 on the type-A port 132 from a DC-DC power converter 138, which, in turn, receives the VIN 160. The type-A port 132 also includes a D+(DP) 140-1 and D− (DM) 140-2 pins, which are responsible for power negotiation with any external sink device (not shown in figure) that is connected to the type-A port 132. The power negotiation can yield a power profile required for the external sink device, that is to be provided by the type-A VBUS 182. Communication regarding the power profile occur between the type-A port 132 and USB controller 104 through DP channel (DP-2) 194-1 and DM (DM-2) channel 194-2 (herein, also collectively referred to as D+/D− channel 194). Digital communication and/or feedback control signals pertaining to the power profile then occur between the USB controller 104 and the DC-DC power converter 138 to provide type-A VBUS 182 as per the required power profile. The required power profiles for the external sink device connected to type-A port 132 can occur through negotiation through the DP 140-1 and DM 140-2 pins using standardised protocols such as QC 2.0, QC 3.0 and the like.

In the above described conventional device, power delivery occurs through the device 100B as described above, which includes a combination of a type-C and a type-A port that may require multiple DP and DM signals between the common USB controller 104 and individually with the type-A port 132 as well as the type C port 102 as shown in FIG. 1B. However, the presence of independent D+/D− lines with a common controller may not be advisable as the USB controller supporting such characteristics may be complex and hence expensive.

The present disclosure intends to overcome the disadvantages and limitations of the conventional devices similar to those described hereinabove in FIGS. 1A and 1B. The present disclosure relates, in general, to power delivery through a universal serial bus (USB) port of USB-C based power supply device. In particular, the present disclosure relates to power delivery through two or more USB ports of a USB-C based power supply device, which includes at least one USB type-A port and a single USB type-C port, that are powered via one single controller.

The present disclosure provides a multiport power supply device, which includes one USB type-C and at least one USB type-A port, where the device includes a single Type-C Controller that is modified in such a way the single Type-C controller can enable control of power delivery for both Type-C port and Type-A ports. The use of a single controller makes the design less complex thereby enhancing the cost-effectiveness of the configuration, thereby providing a multiport power supply device that is compact and inexpensive when compared with multiport power supply devices found in the art.

In an aspect, the present disclosure provides a multiport universal serial bus (USB)-C based power supply device, which includes: a USB type-C port configured to supply power to a type-C external sink device, the type-C port including: a type-C power supply pin (type-C VBUS pin)

adapted for supplying type-C power (type-C VBUS) to the respective connected type-C external sink device; and configuration channel pins (CC pins) adapted for power negotiation with the respective connected type-C external sink device. The device includes at least one USB type-A port configured to supply power to at least one type-A external sink device, each of the type-A port including: a type-A power supply pin (type-A VBUS pin) adapted for supplying type-A power (type-A VBUS) to the respective connected type-A external sink device; and data terminal pins (D+/D− pins) adapted for power negotiation with the respective connected type-A external device. The device includes a configurable power source and a controller, wherein the configurable power source is operable on receipt of at least one of a digital communication signal and a feedback control signal, adapted for provision of type-C VBUS and type-A VBUS to the type-C VBUS pin and the type-A VBUS pin respectively. The controller is operatively coupled with the configurable power source, the USB type-C port and the USB type-A port, wherein the controller includes a processor operatively coupled with a memory, the memory storing instruction executable by the processor to: receive, from the CC pins, through a configuration channel (CC channel), information pertaining to power negotiation with the respective connected type-C device to generate a type-C power profile for the connected type-C device; and receive, from the D+/D− pins, through a data channel (D+/D− channel), information pertaining to power negotiation with the respective connected type-A device to generate a type-A power profile for the connected type-A device. The controller can be configured to generate, based on the generated type-C power profile, the digital communication and/or feedback control signals to be sent to the configurable power source. The controller can be configured to generate, based on the generated type-A power profile, the tdigital communication and/or feedback control signals to be sent to the DC-DC power converter. The operation of the multiport USB-C based power supply device by a single controller may facilitate compact construction of the multiport USB-C based power supply device.

In an embodiment, the configurable power source can be adapted to, based on the received at least one of a digital communication signal and a feedback control signal to the configurable power source and DC-DC power converter provide corresponding required values of type-C VBUS and type-A VBUS to the type-C port and the type-A port respectively, wherein both the type-A and type-C ports can work independently.

In another embodiment, the device can include a power management chip and AC-DC converter and DC-DC PMIC that is configured to control value of type-C VBUS and type-A VBUS to the type-C port and the type-A port, respectively.

In an exemplary embodiment, the configurable power source for type-C port can be a secondary of the AC-DC converter.

In another exemplary embodiment, the configurable power source for type-A port can be a DC-DC power converter.

In another embodiment, the type-C port can include data terminals (D+/D− pins), and wherein the D+/D− pins are shorted, wherein the type-C port supports BC1.2 DCP mode.

In an aspect, the present disclosure provides a method for operation of the multiport universal serial bus (USB)-C based power supply device, the method including: receiving, at the controller, from the CC pins through the configuration channel (CC channel), information pertaining to power negotiation with the respective connected type-C device to generate a type-C power profile for the connected type-C sink device; receiving, at the controller, from the D+/D− pins, through a data channel (D+/D− channel), information pertaining to power negotiation with the respective connected type-A device to generate a type-A power profile for the connected type-A sink device; generating, at the controller, based on the generated type-C power profile and type-A power profile, a digital communication and/or feedback control signals corresponding to required values of type-C VBUS and type-A VBUS respectively; and operating, through the controller, the configurable control supply, based on receipt of the generated digital communication and/or feedback control signal to the configurable power source and digital communication and/or feedback control signal to the DC-DC power converter to provide corresponding required values of type-C VBUS and type-A VBUS to the type-C port and the type-A port respectively. Operation of the multiport USB-C based power supply device by a single controller facilitates compact construction of the multiport USB-C based power supply device.

Figure 2A:
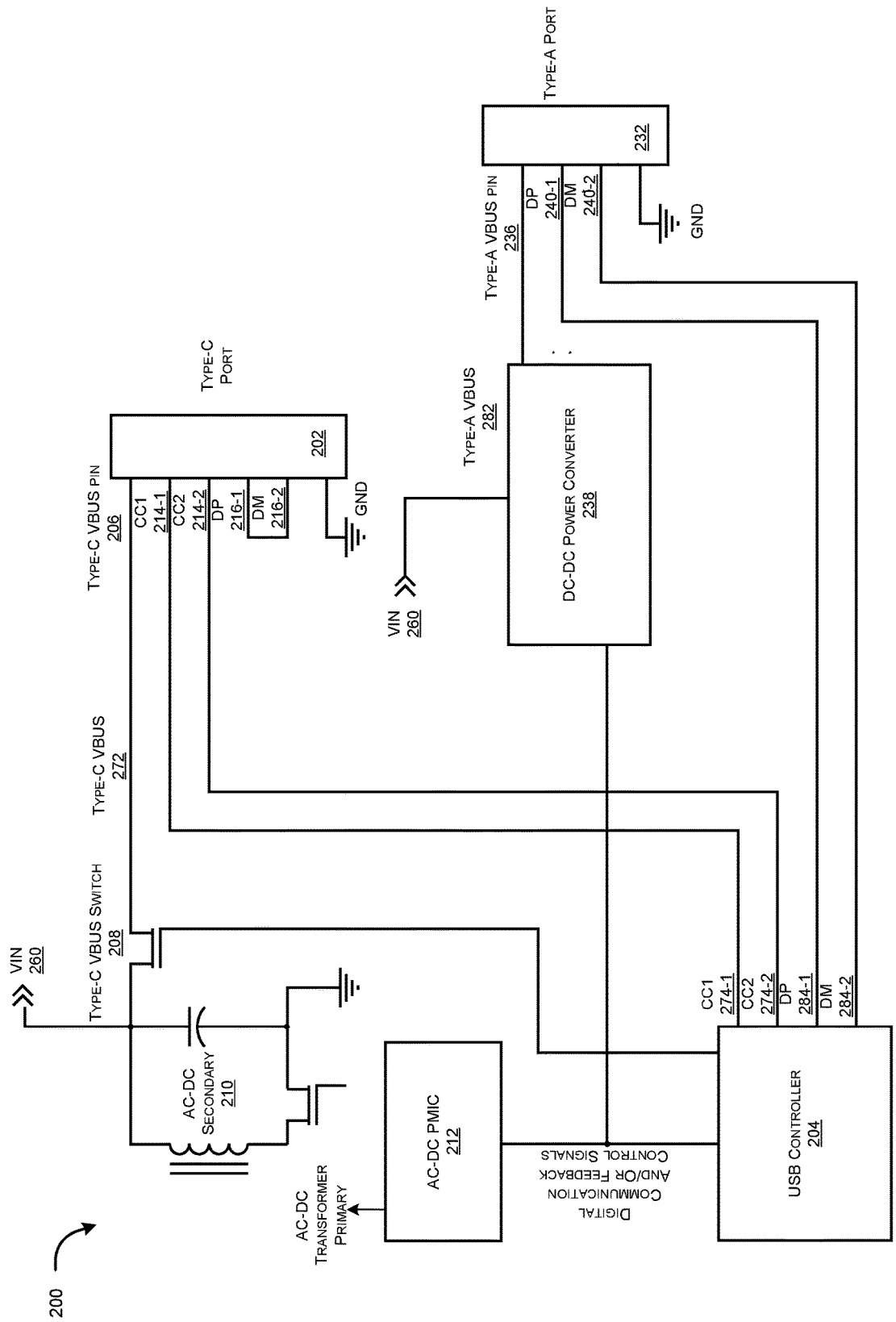
FIG. 2A illustrates an exemplary schematic representation of a multiport universal serial bus (USB)-C based power supply device with a controller for controlling power delivery through the device, in accordance with an embodiment of the present disclosure.

FIG. 2A illustrates an exemplary schematic representation of a multiport universal serial bus (USB)-C based power supply device with a USB-C controller for controlling power delivery through the device, in accordance with an embodiment of the present disclosure. Here, the device 200 can include USB type-A and USB type-C ports.

As per an embodiment and as shown in FIG. 2A, the device 200 can include: a USB type-C port 202, wherein power delivered through the port can be controlled by a USB-C controller 204 (hereinafter, also referred to as controller 204); and a USB type-A port 232, wherein power delivered through the port can be controlled by the same controller 204.

It may be appreciated that the device 200 can include one USB type-C port and one or more USB type-A ports, and wherein power delivery through the ports may still be controlled by a single USB-C controller.

Referring to 200 in FIG. 2A, an input voltage VIN 260 may supply power to both the USB type-C port 202 and the DC-DC power converter 238.

In an embodiment, in the case of the USB type-C port 202, type-C VBUS 272 is supplied to a type-C VBUS pin 206 on the type-C port 202 through a switch 208 after passing through an AC-DC converter 210. The type-C VBUS 272 is regulated by the AC-DC converter 210 in conjunction with a power management chip (PMIC) 212. The type-C port 202 also includes communications channel pins CC1 214-1 and CC2 214-2 (hereinafter, also collectively referred to as CC pins 214), which are responsible for power negotiation with any external sink device (not shown in figure) that is connected to the type-C port 202. The power negotiation can yield a power profile required for the external sink device, that is to be provided by the type-C VBUS 272.

In another embodiment, communication regarding the power profile occurs between the type-C port 202 and the controller 204 through CC1 channel 274-1 or CC2 channel 274-2 (herein, also collectively referred to as CC channel 274), that are provided on the controller 204.

In another embodiment, the controller 204 is configured to, based on the power profile required for sink device, generate a digital communication and/or feedback control signals, which is indicative of the value of type-C VBUS 272 to be provided to the external sink device. Digital communication and/or feedback control signals pertaining to the power profile, then occur between the controller 204 and the PMIC 212 to provide the type-C VBUS 272 as per required power profile.

In another embodiment, additionally, the type-C port 202 also include D+(DP) 216-1 and D− (DM) 216-2 pins (herein, also collectively referred to as D+/D− pins 216). However, the DP 216-1 and DM 216-2 pins may be shorted, and the type-C port supports battery charging (BC) 1.2 dedicated charging port (DCP) mode.

In an embodiment, in the case of the USB type-A port 232, type-A VBUS 282 is supplied to a type-A VBUS pin 236 on the type-A port 232 from a DC-DC power converter 238, which, in turn, receives the VIN 260. The type-A port 232 also includes a D+(DP) 240-1 and D− (DM) 240-2 pins (hereinafter, also collectively referred to as D+/D− pins 240), which are responsible for power negotiation with any external sink device (not shown in figure) that is connected to the type-A port 232. The power negotiation can yield a power profile required for the external sink device, that is to be provided by the type-A VBUS 282.

In another embodiment, communication regarding the power profile occur between the type-A port 232 and the controller 204 through DP channel 284-1 and DM channel 284-2 (herein, also collectively referred to as D+/D− channel 284) that are provided on the controller 204. Since the controller 204 has no communications in the D+/D− channel 284 with the type-C port 202, the D+/D− channel 284 can be used exclusively for communication with the DP 240-1 and DM 240-2 pins on the type-A port 232 which eliminates the requirement for a separate USB-A/USB-B controller in the multiport power adapter design thereby reducing complexity and cost.

In another embodiment, the controller 204 is configured to generate a digital communication and/or feedback control signals pertaining to the power profile, is generated between the controller 204 and the PMIC 212, followed subsequently by related communication between the controller 204 and the DC-DC power converter 238 to provide type-A VBUS 282 as per required power profile.

Hence, the proposed device 200 can supply power to the type-C port 202 and the type-A port 232 using a single USB-C controller 204, thereby eliminating the need for dedicated controllers for the ports. The sharing of signals from the controller 204, i.e., use CC channel 274 and D+/D− channel 284 for communications regarding power negotiations with both the type-C port 202 and the type-A port 232 respectively allows for simultaneous power delivery through the type-C port 202 and the type-A port 232 according to respective power profiles.

The USB-C controller 204 may include a memory that can store instructions for controlling power delivery through type-C port and type-A port. The memory may be operatively coupled with one or more processors, which are configured to execute the instructions stored in the memory.

Figure 2B:
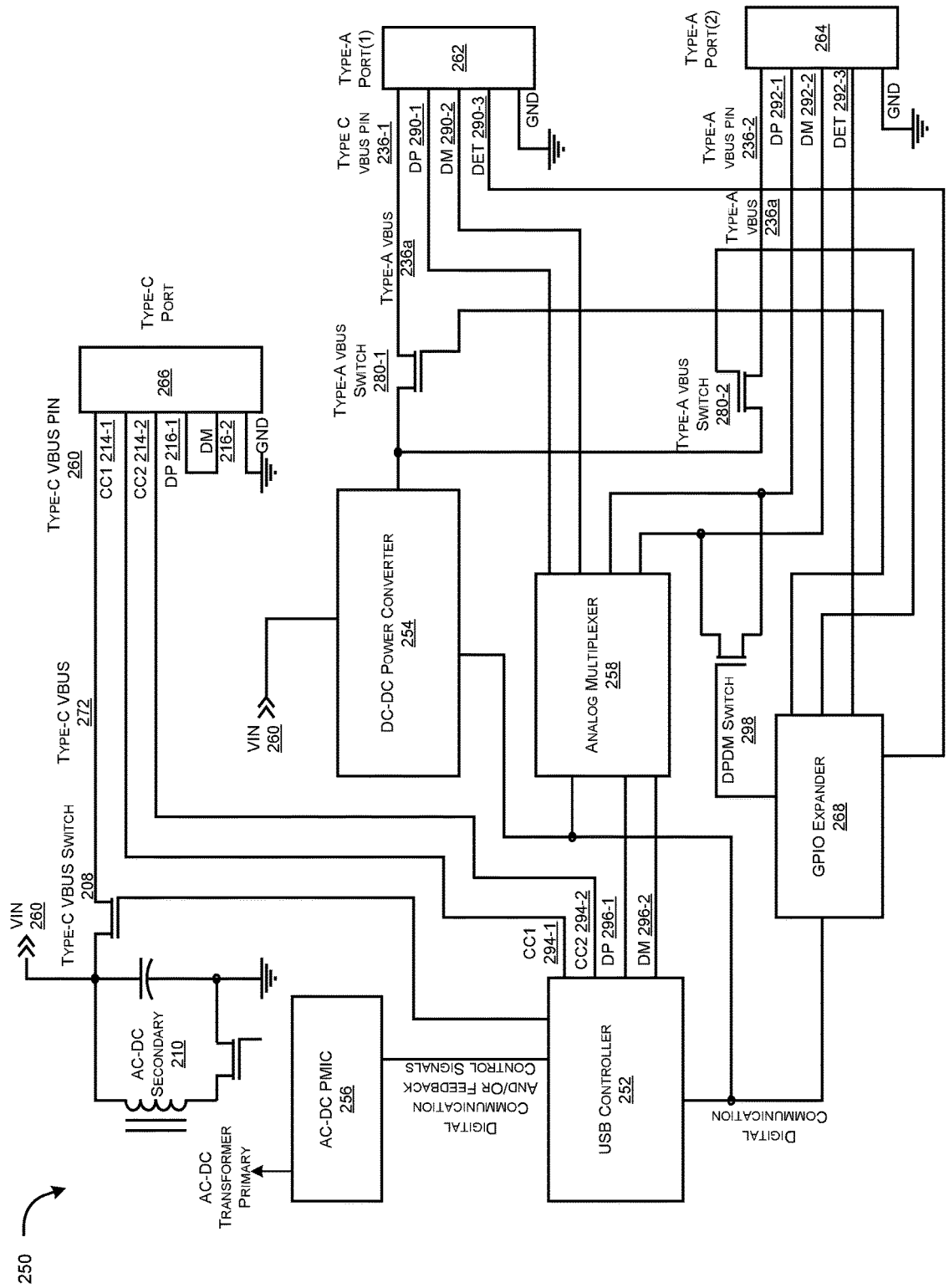
FIG. 2B illustrates an exemplary schematic representation of a multiport universal serial bus (USB)-C based power supply device with a controller for controlling power delivery to one type-C port and selective power delivery to two type-A ports through the device, in accordance with an embodiment of the present disclosure

FIG. 2B illustrates an exemplary schematic representation of a multiport universal serial bus (USB)-C based power supply device 250 with a controller 252 for controlling power delivery through the device 250, in accordance with an embodiment of the present disclosure. Here, the device 250 can include two USB type-A ports and one USB type-C port.

As per an embodiment and as illustrated in FIG. 2B, the device 250 can include: a USB type-C port 266, power delivered through which can be controlled by a USB-C controller 252 (herein, also referred to as controller 252), wherein the USB-C controller 252 is designed for controlling the type-C port, however, as per the embodiments of the present disclosure, a modified configuration is provided such that a single controller (252) (meant for type-C port) can be also used to control multiple type-A ports, while overcoming the limitations of the conventional systems.

In an aspect, when the multiport universal serial bus (USB)-C based power supply device (250) includes plurality of the type-A ports, at least one detection pin 1 (DET) is provided on each type-A port such that the power supply to the at least one of the plurality of the type-A ports is enabled based on generation of a detection signal received by the at least one detection pin (DET). In an embodiment, if at least one of the plurality of type-A ports is connected to a sink device, the detection signal is received by the controller using general purpose input-output (GPIO) expander. In an embodiment, based on the detection signal, an analog multiplexer connected to the controller enables to establish a connection between the second set of data terminal pins of the controller and the first set of data terminal pins of the at least one type-A port by controlling a VBUS switch connected to each type-A port, wherein upon receipt of the detection signal from a single port of the plurality of ports, the single port is supplied with power as per the power profile of the type-A port, wherein upon receipt of the detection signal from multiple type-A ports of the plurality of ports, a first port selected from the multiple type-A ports, having a pre-determined power profile, is enabled power supply at limited default value of 5V DC in BC1.2 configuration, followed by which power is supplied to another of the multiple type-A ports, at the default value of power 5V DC in BC1.2 configuration Referring to FIG. 2B, an input voltage VIN 260 may supply power to both the USB type-C port 266 and the DC-DC power converter 254.

In an embodiment, in the case of the USB type-C port 266, type-C VBUS 272 is supplied to a type-C VBUS pin 260 on the type-C port 266 through a switch (MOSFET). The type-C VBUS 272 is regulated by the AC-DC converter 210 in conjunction with a power management chip (PMIC) 256. The type-C port 266 also includes communications channel pins CC1 214-1 and CC2 214-2 (herein, also collectively referred to as CC pins 214), which are responsible for power negotiation with any external sink device (not shown in figure) that is connected to the type-C port 266. The power negotiation can yield a power profile required for the external sink device, that is to be provided by the type-C VBUS 272.

The communication regarding the power profile occurs between the type-C port 266 and the controller 252 through CC1 channel 294-1 or CC2 channel 294-2 (herein, also collectively referred to as CC channel 294) respectively, that are provided on the controller 252.

The controller 252 is configured to, based on the power profile required for sink device, generate at least one of the digital communication signal and the feedback control signal, which is indicative of the value of type-C VBUS 272 to be provided to the external sink device. Digital communication and/or feedback control signals pertaining to the power profile, occur between the controller 252 and the PMIC 256 to provide a type-C VBUS 272 as per required power profile.

Additionally, the type-C port 266 also include D+(DP) 216-1 and D− (DM) 216-2 pins (herein, also collectively referred to as D+/D− pins 216). However, the DP 216-1 and DM 216-2 pins may be shorted, and the type-C port supports BC1.2 DCP mode.

In an embodiment, in the case of the two USB type-A ports 262 and 264, type-A VBUS 236a and 236b, respectively is supplied to a type-A VBUS pins 236-1 and 236-2 on the two type-A ports 262 and 264, respectively from a DC-DC power converter 254, which, in turn, receives the VIN 260. The USB type-A port 262 includes a D+(DP) 290-1 and D− (DM) 290-2 pins (herein, also collectively referred to as D+/D− pins 290). The USB type-A port 264 includes a D+(DP) 292-1 and D− (DM) 292-2 pins (herein, also collectively referred to as D+/D− pins 292). The D+/D− pins 290 and 292 are responsible for power negotiation with any external sink device (not shown in figure) that is connected to USB type-A ports 262 and 264 respectively. The power negotiation can yield a power profile required for the external sink device, that is to be provided by the type-A VBUS 236a and 236b respectively.

The communication regarding the power profile occur between the type-A ports 262 and 264 and the controller 252 occurs via a configuration having an analog multiplexer 258. The controller 252 connects to one type-A port (non standard Type-A connector) (out of 262 and 264) at a time by way of this arrangement. The connection may be enabled by a DET channel (pin) 290-3 AND 292-3 on type-A ports 262 and 264 respectively such that based on the detection via respective DET channel, control of power supply may be enabled to any of the type-A ports 262 and 264. Since the controller 252 has no communications in the D+/D-channel 296-1 and 296-2 (collectively termed as 296) with the type-C port 266, the D+/D-channel 296 can be used exclusively for communication with the type-A ports via the above-mentioned arrangement 232 which eliminates the requirement for a separate USB-A/USB-B controller in the multiport power adapter design thereby reducing complexity and cost.

In an embodiment as illustrated in FIG. 2B, the type-C port 266 can work independently irrespective of Type-A ports status (262, 264). The Type-A ports (262, 264) supported power profiles is summarized in Table 1 below that clearly indicates the dependency on the Type-A port connection status. When both Type-A ports are connected, the data terminal (DPDM) switch 298 is turned ON to present short on DP/DM lines 292 of second Type-A port 264 to indicate BC1.2 Charging; wherein for first Type-A port 262, DP/DM 290 lines short is established inside the USB controller 252 and presented through Analog multiplexer 258 to indicate BC1.2 Charging. In an embodiment, if both Type-A ports are not connected, the Type-A VBUS switches 280-1 and 280-2 may be open (OFF) such that the multiplexer 258 can be in high impedance state and DP and DM pins (jointly referred as 296) of the USB-C controller 252 may not be connected to any of the Type-A ports DP and DM pins (290, 292). In another embodiment, if any one of the Type-A connector (262 or 264) is connected to sink device (Cable plug inserted) the DET pin of respected Type-A connector state may change and this can be detected by USB-C controller 252 through GPIO expander 268. Then the USB-C controller 252 can configure the Analog multiplexer 258 to establish a connection between DP and DM pin 296 of the USB controller 252 to respective DP and DM pins (290 or 292) of the Type-A port (262 or 264) for supporting QC or other custom and proprietary charging protocols and the respective Type-A VBUS switch (280-1 or 280-2) can be turned ON. The Type-A VBUS 236a or 236b can be provided to respective Type-A connectors. The USB-C controller 252 can process the QC or custom and proprietary protocols and adjust the output of DC-DC power converter 254 voltage and/or current as per sink request through digital communication and/or feedback control signal. If any one of Type-A ports (262 or 264) providing requested power profile got connected through its respective Det channel (pin) (290-3 or 292-3), the first connected Type-A may be restarted to default 5V DC in BC1.2 configuration and then the VBUS switch of the other Type-A connected port respected can be enabled, both or all Type-A ports being restricted to BC1.2 configuration.

TABLE 1

Summary of supported power profile for Type-A ports 262 and 264

| Type-A Port 1 (262) | Type-A Port 2 (264) | Power Profile on Port 1 | Power Profile on Port 2 | Indicated by |
|---|---|---|---|---|
| Not Connected | Not Connected | OFF | OFF | No Detection indicated by Port 1 & Port 2 |
| Connected | Not Connected | As requested by Sink device to maximum | OFF | Det Pin (290-3) on Port 1 (262) |
| Not Connected | Connected | OFF | As requested by Sink device to maximum | Det Pin (292-3) on Port 2 (264) |
| Connected | Connected | BC1.2 (7.5W with 5V @1.5A) | BC1.2 (7.5W with 5V@1.5) | Det Pin (290-3 and 292-3) on Port 1 (262) and Port 2 (264) |

In another embodiment, the controller 252 is configured to, based on the power profile required, generate at least one of a digital communication signal and a feedback control signal which is indicative of the value of type-A VBUS 236a and 236b to be provided to the external sink device. The digital communication and/or feedback control signals pertaining to the power profile, is generated between the controller 252 and the PMIC 256, followed subsequently by related communication between the controller 252 and the DC-DC power converter 254 to provide power to type-A VBUS 236a and 236b, as per the required power profile.

Hence, the proposed device 250 can supply power to the type-C port 266 and any or a combination of the type-A ports 262 and 264 using a single controller 252 thereby eliminating the need for dedicated controllers for different types and various number of ports, such that out of the two type-A ports, the power may be supplied to any or a combination of the type-A ports 262 and 264 based on detection signal from the detection pin, which enhances the controllability and the workability of the power supply device while providing a simpler and cost-effective configuration for effective power supply to multiple ports based on requirements.

The controller 252 may include a memory storing instructions for controlling power delivery through type-C port and type-A ports. The memory may be operatively coupled with one or more processors, which are configured to execute the instructions stored in the memory. Thus, using a controller 252 that is designed to control type-C port, the above explained configuration allow selective control of power supply to at least one or multiple type-A ports.

Figure 3:
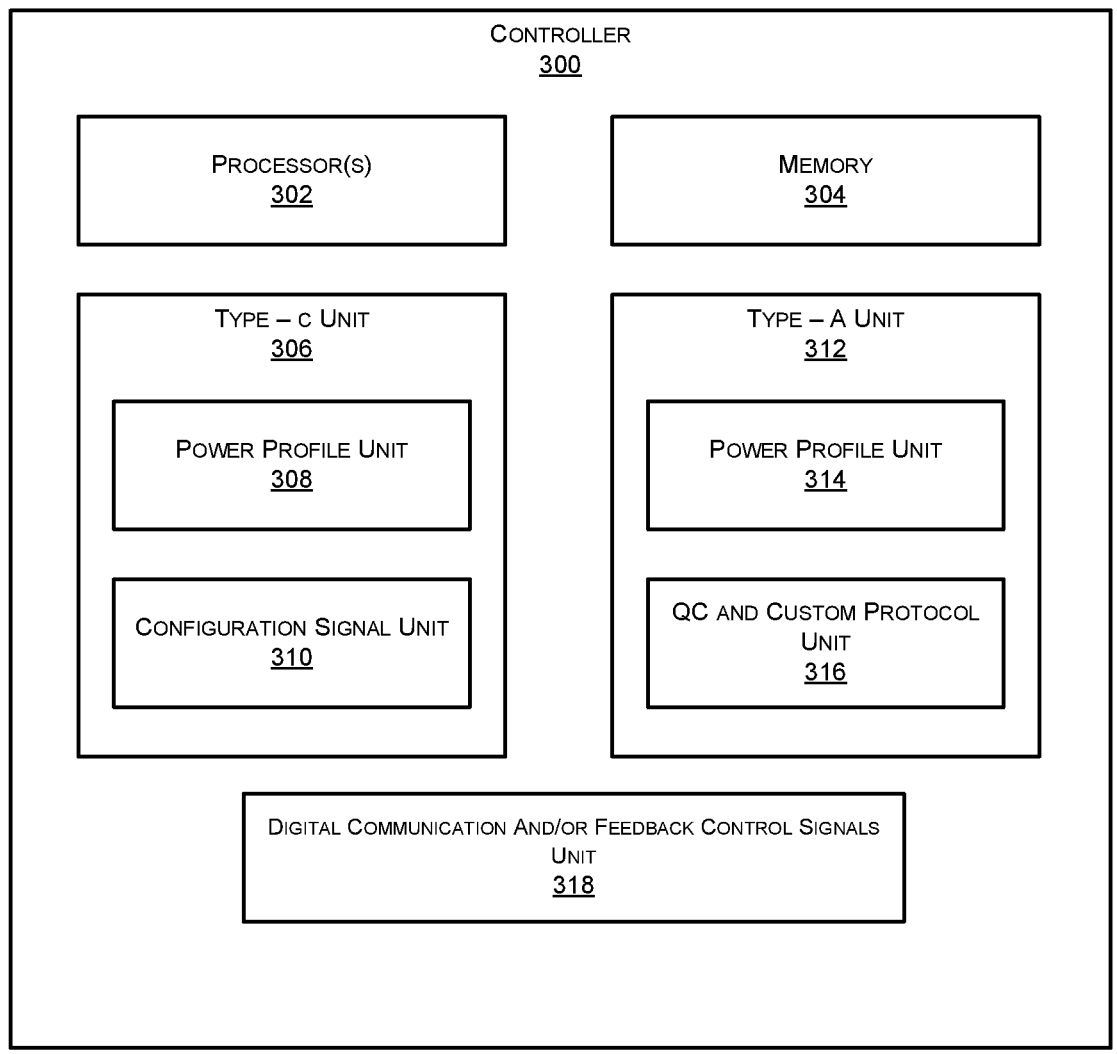
FIG. 3 illustrates an exemplary module diagram of the USB-C controller of the proposed multiport universal serial bus (USB)-C based power supply device, in accordance with an embodiment of the present disclosure.

FIG. 3 illustrates an exemplary module diagram of the USB-C controller (300, analogous to other numerals 204 and 252 used earlier) of the proposed multiport universal serial bus (USB)-C based power supply device, in accordance with an embodiment of the present disclosure. The controller 300 may include one or more processors 302 operatively coupled with a memory 304, the memory 304 storing instructions executable by the one or more processors 302 to control power delivery in the device.

In an embodiment, the controller 204 may include: a USB-PD type-C unit 306 configured for operation of the type-C port; and a DPDM (type-A) unit 312 configured for operation of the type-A port.

In another embodiment, the USB-PD type-C unit 306 can include: a type-C power profile unit 308 configured to, based on power negotiation between the type-C port and an external sink device connected to the type-C port, generate a power profile indicative of type-C VBUS required for the external device.

In another embodiment, the USB-PD unit 306 can include: communication channel—CC unit 310 corresponding to type-C port and configured to, based on the power profile required, generate at least one of the digital communication signal and the feedback control signal which is indicative of the value of type-C VBUS to be provided to the external sink device. The type-C VBUS communicated by configuration signal is communicated to PMIC unit that is operatively coupled with the controller, which supplies the required type-C VBUS to the type-C VBUS pin on the type-C port through a digital communication and/or feedback control signals unit 318.

In another embodiment, the DPDM unit 312 can include: power profile unit 314 configured to, based on power negotiation between the type-A port and an external sink device connected to the type-A port, generate a power profile indicative of type-A VBUS required for the external device.

In another embodiment, the type-A unit 312 can include: QC or custom and proprietary protocol unit 316 configured to generate at least one of the digital communication signal and the feedback control signal which is indicative of the value of type-A VBUS to be provided to the external sink device. The digital communication signal and/or the feedback control signal is communicated to the DC-DC power converter 254 operatively coupled with the controller, which enables sending the required power to the type-A VBUS pin on VBUS of the type-A port.

Figure 4A:
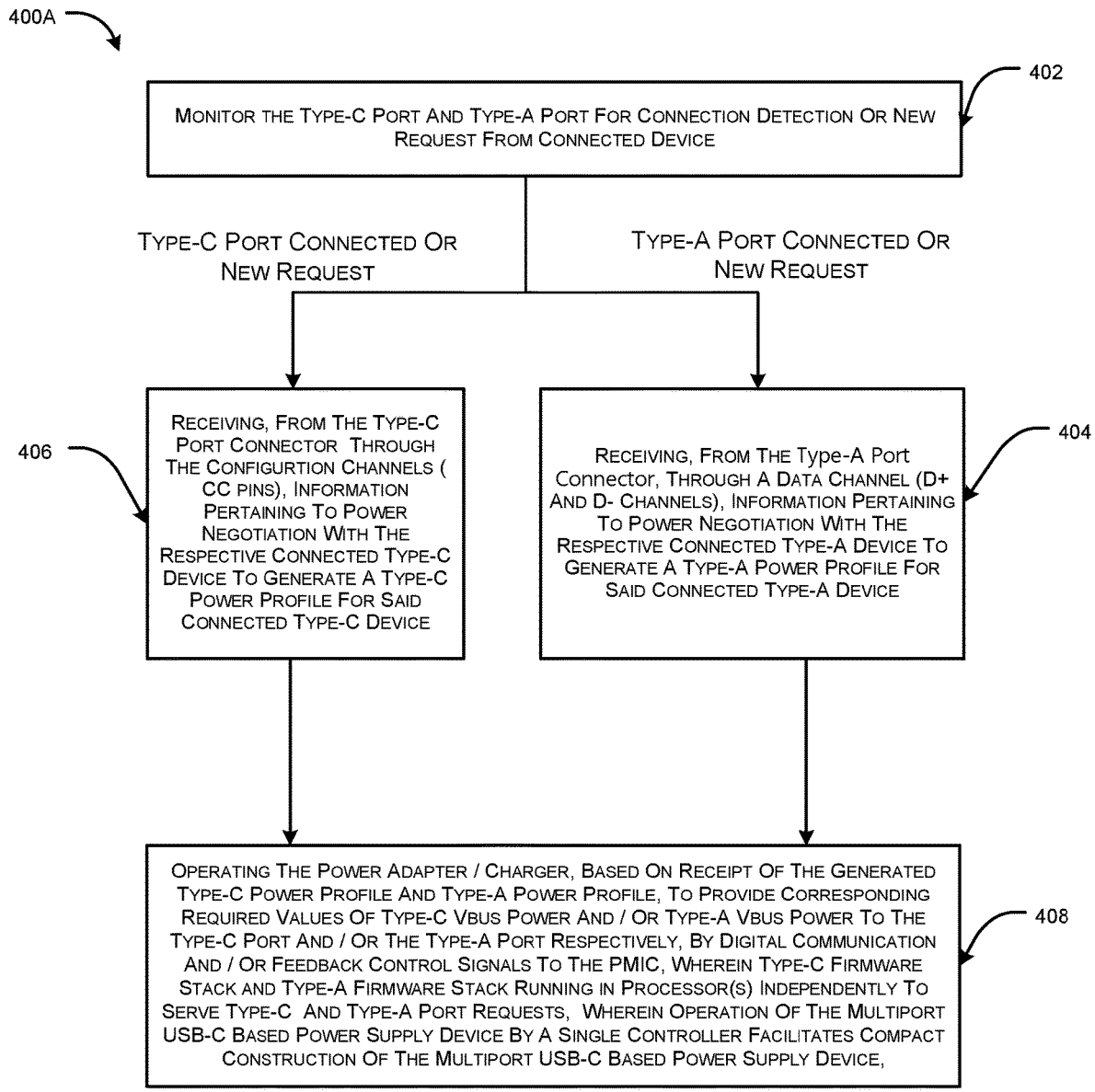
FIGS. 4A and 4B illustrate exemplary flow diagrams for a method to operate the proposed multiport universal serial bus (USB)-C based power supply device, in accordance with embodiments of the present disclosure.
Figure 4B:
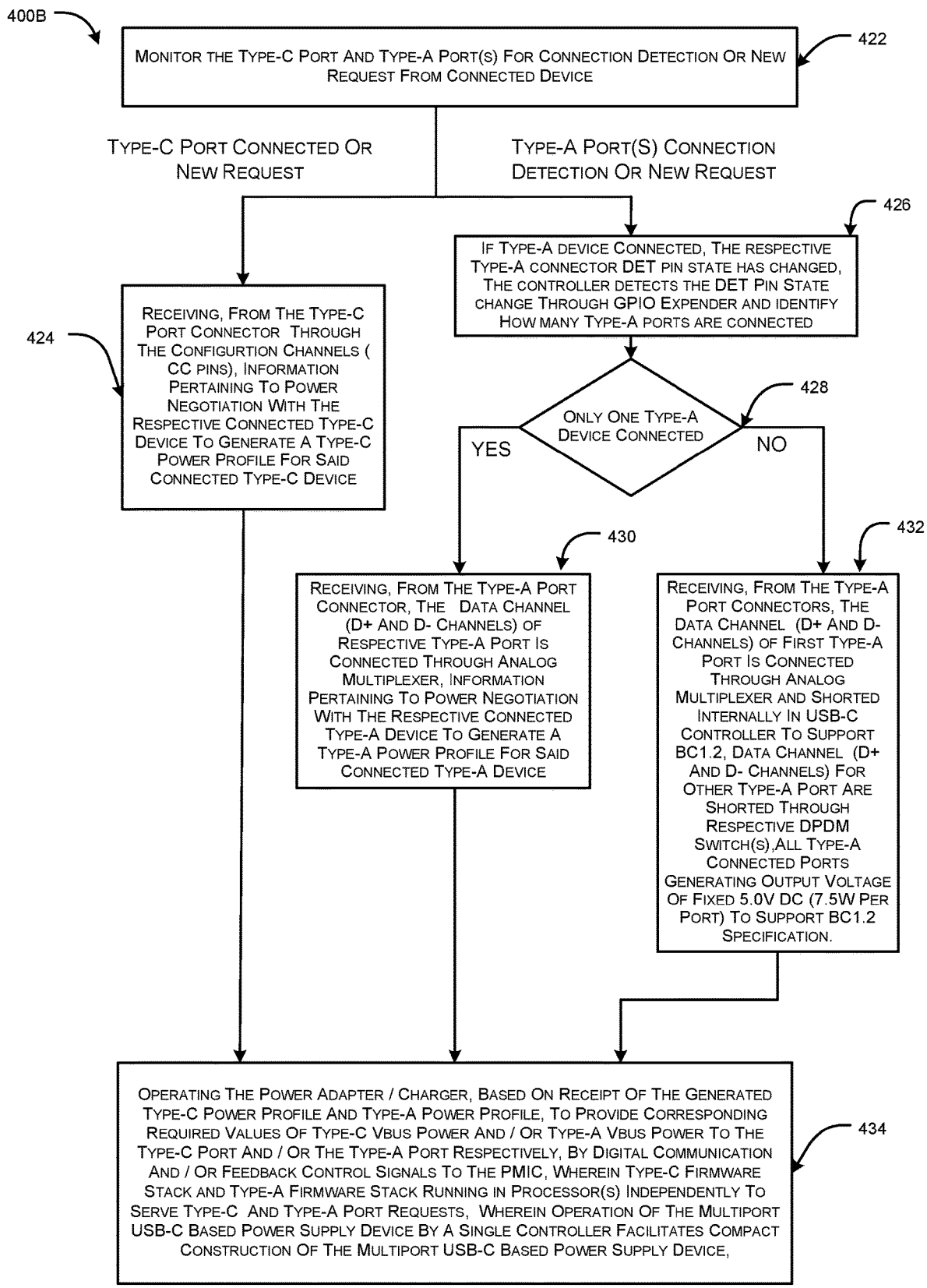

FIG. 4A illustrates an exemplary flow diagram 400A for a method to operate the proposed multiport universal serial bus (USB)-C based power supply device, in accordance with an embodiment of the present disclosure. The method 400A may be implemented in the controller of the device, where the controller may include a memory storing instructions for controlling power delivery through a type-C port and a type-A port, and where the memory may be operatively coupled with one or more processors, which are configured to execute the instructions stored in the memory. The method 400A can include, At 402—monitor the type-C port and the type-A port for connection detection or new request from connected device; Based on whether Type-C port or Type-A port is connected or requested:

If Type-C port connected or requested,

At 406—receive, from the type-C port connector through the configuration channels (CC pins), information pertaining to power negotiation with the respective connected type-C device to generate a type-C power profile for the connected type-C device;

If Type-A port connected or requested,

At 404—receive, from the type-A port connector, through a data channel (D+ and D− channels), information pertaining to power negotiation with the respective connected type-A device to generate a type-A power profile for the connected type-A device;

In case of 404 or 406:

At 408: operate the power adapter/charger, based on receipt of the generated type-C power profile and type-A power profile, to provide corresponding required values of type-C VBUS power and/or type-A VBUS power to the type-C port and/or the type-A port respectively, by digital communication and/or feedback control signals to the PMIC, wherein type-C firmware stack and type-A firmware stack running in processor(s) independently to serve type-C and type-A port requests, wherein operation of the multiport USB-C based power supply device by a single controller facilitates compact construction of the multiport USB-C based power supply device, FIG. 4B illustrates an exemplary flow diagram 400B for a method to operate the proposed multiport universal serial bus (USB)-C based power supply device, in accordance with another embodiment of the present disclosure. The method 400B may be implemented in the controller of the device, where the controller may include a memory storing instructions for controlling power delivery through a type-C port and one or more type-A ports, and where the memory may be operatively coupled with one or more processors, which are configured to execute the instructions stored in the memory. The method 400B can include, At 422—monitor the type-C port and type-A port(s) for connection detection or new request from connected device; Based on whether Type-C port or Type-A port is connected or requested:

If Type-C port connected or requested,

At 424: receive, from the type-C port connector through the configuration channels (CC pins), information pertaining to power negotiation with the respective connected type-C device to generate a type-C power profile for the connected type-C device;

if Type-A port connection detection or requested,

At 426: if type-A device connected, the respective type-A connector DET pin state has changed, the controller detects the DET pin state change through GPIO expender and identify how many type-A ports are connected;

At 428: Check if only one type-A device is connected:

If YES in case of 428:

At 430: receive, from the type-A port connector, the data channel (D+ and D− channels) of respective type-A port connected through analog multiplexer, information pertaining to power negotiation with the respective connected type-A device to generate a type-A power profile for said connected type-A device If NO in case of 428:

At 432: receive, from the type-A port connectors, the data channel (D+ and D− channels) of first type-A port is connected through analog multiplexer and shorted internally in USB-C controller to support BC1.2, data channel (D+ and D− channels) for other type-A port are shorted through respective DPDM switch(s), all type-A connected ports generating output voltage of fixed 5.0V DC (7.5 W per port) to support BC1.2 specification.

In case of any of 424, 430 or 432: At 434 operate the power adapter/charger, based on receipt of the generated type-C power profile and type-A power profile, to provide corresponding required values of type-C VBUS power and/or type-a VBUS power to the type-C port and/or the type-A port respectively, by digital communication and/or feedback control signals to the PMIC, wherein type-C firmware stack and type-A firmware stack running in processor(s) independently to serve type-C and type-A port requests, wherein operation of the multiport USB-C based power supply device by a single controller facilitates compact construction of the multiport USB-C based power supply device.

Figure 5:
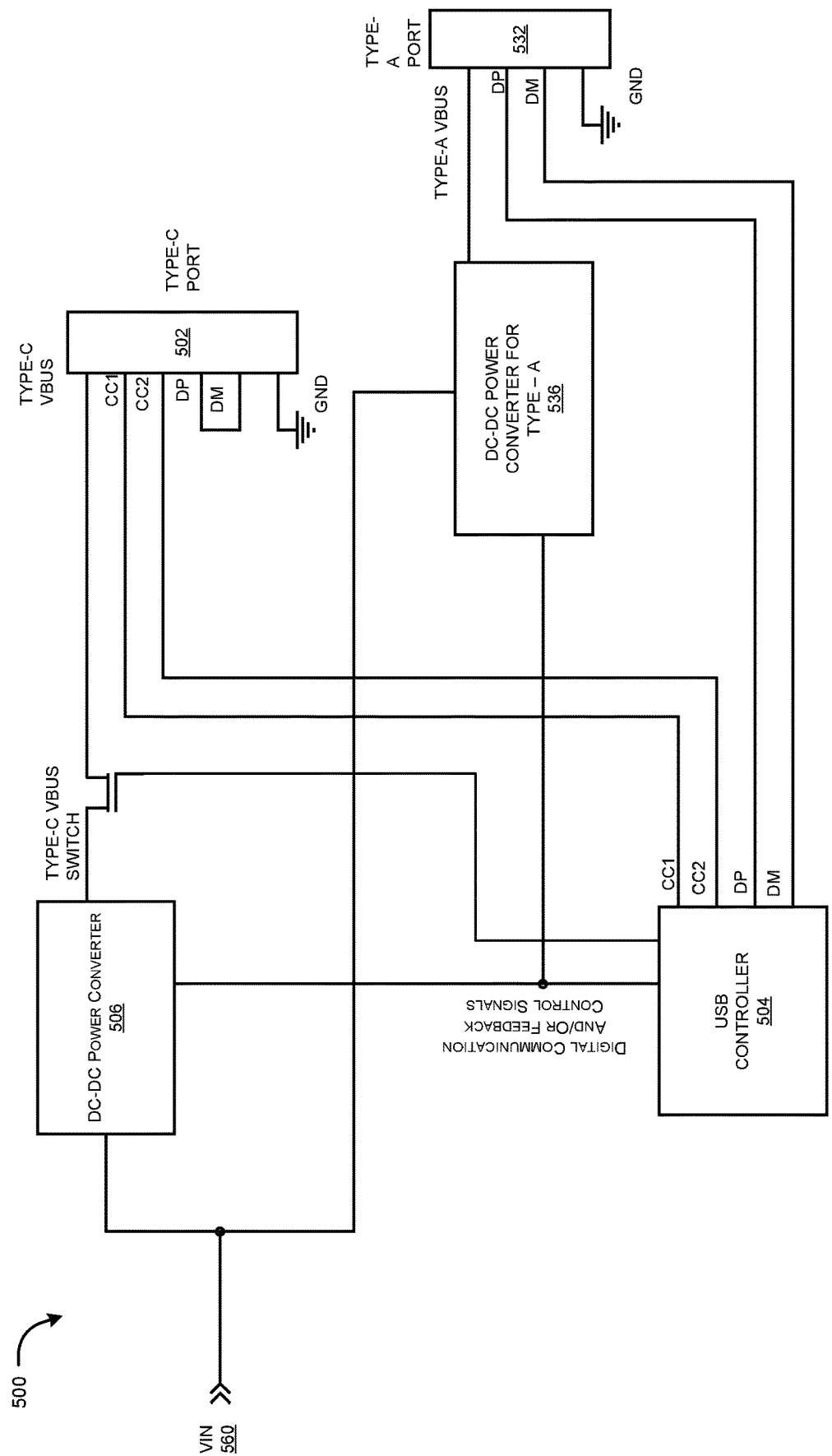
FIG. 5 illustrates an exemplary schematic representation of an implementation of the proposed multiport universal serial bus (USB)-C based power supply device with DC input for automobile applications, in accordance with an embodiment of the present disclosure.

FIG. 5 illustrates an exemplary schematic representation of an implementation of the proposed multiport universal serial bus (USB)-C based power supply device with DC input for automobile applications, in accordance with an embodiment of the present disclosure. FIG. 5 illustrates an exemplary power supply device 500 configured with a type-C port 502 and a type-A port 532. The device 500, in an exemplary implementation, may be used in an automobile for the purpose of charging external devices through either or both of the type-C port 502 and type-A port 532. An input voltage VIN 560 may supply power to both the USB type-C port 502 and the USB type-A port 532, where VIN 560 may be a DC signal generated by the automobile DC input or a battery.

In an embodiment, the device 500 includes a controller 504 that is configured to control power supply to the ports, i.e., the controller 504 is configured to control value of the type-C VBUS and the type-A VBUS provided at the type-C port 502 and the type-A port 532 respectively.

In another embodiment, type-C VBUS is generated at a type-C DC-DC power converter 506, and type-A VBUS is generated at a type-A DC-DC power converter 536.

The present disclosure provides a multiport USB-C based power supply device with a USB-C controller for controlling power supply through USB ports provided on the device.

The present disclosure provides a USB-C based power supply device that provides a modified configuration that enables to utilize a controller meant for type-C port to be also effectively used for one or more type-A ports.

The present disclosure provides a multiport USB-C based power supply device that is compact and economical.

We claim:

1. A multiport universal serial bus (USB)-C based power supply device comprising:
   one USB type-C port configured to supply power to a connected type-C external sink device, wherein the one USB type-C port comprises:
      a type-C power supply pin corresponding to a type-C VBUS configured to supply type-C power to the connected type-C external sink device; and
      a first set of configuration channel pins (CC pins) configured to conduct power negotiation with the connected type-C external sink device;
   at least one USB type-A port configured to supply power to at least one connected type-A external sink device, each of the at least one USB type-A port comprises:
      a type-A power supply pin corresponding to a type-A VBUS configured to supply type-A power to a corresponding one of the at least one connected type-A external sink device; and
      a first set of data terminal pins comprising one or more pairs of a positive terminal pin (DP) and a negative terminal pin (DM), wherein said first set of data terminal pins is configured to conduct power negotiation with the corresponding one of the at least one connected type-A external sink device;
   a configurable power source configured to, on receipt of at least one of a digital communication signal and a feedback control signal, provision the type-C VBUS and the type-A VBUS to the type-C power supply pin and the type-A power supply pin respectively; and
   a controller operatively coupled with the configurable power source, a DC-DC power converter, said USB type-C port and said at least one of the USB type-A port, the controller comprising:
      a second set of data terminal pins, wherein the controller has no other data terminal pins other than the second set of data terminal pins, wherein the second set of data terminal pins is not connected to the one USB type-C port,
      a processor operatively coupled with a memory, the memory storing instruction executable by the processor to:
         receive, from the first set of CC pins of the type-C port, using a second set of configuration channels (CC channel) of the controller, a first information pertaining to the power negotiation with the connected type-C external sink device to generate a type-C power profile; and
         receive, from the first set of data terminal pins of said at least one type-A port, using the second set of data terminal pins of the controller, a second information pertaining to the power negotiation with the corresponding one of the at least one connected type-A external sink device to generate a type-A power profile,
      wherein the controller is configured to generate, based on the generated type-C power profile, said at least one of the digital communication signal and the feedback control signal, to be sent to the configurable power source,
      wherein the controller is configured to generate, based on the generated type-A power profile, said at least one of the digital communication and feedback control signal to be sent to the DC-DC power converter,
      wherein said at least one of the digital communication signal and the feedback control signal correspond to a power value to be supplied, to said type-C port and said at least one type-A port respectively,
      wherein the multiport universal serial bus (USB)-C based power supply device comprises a plurality of type-A ports, wherein at least one detection pin (DET) is provided on each of the plurality of type-A ports such that power supply to said at least one of the plurality of said type-A ports is established based on generation of a detection signal received by said at least one detection pin (DET),
      wherein based on said detection signal, an analog multiplexer connected to said controller establishes a connection between said second set of data terminal pins of the controller and said first set of data terminal pins of the said at least one type-A port by controlling a VBUS switch connected to each of a plurality of type-A ports,
      wherein, upon receipt of said detection signal from a single port of a plurality of type A-ports, said single port is supplied with power as per the power profile of the type-A port, and
      wherein, upon receipt of said detection signal from multiple ones of the plurality of type-A ports, a first port selected from said multiple type-A ports, having a pre-determined power profile, is provided a power supply at a limited default value of 5V DC in BC1.2 configuration, followed by which power is supplied to another of said multiple ones of the plurality of type-A ports, at said default value of power 5V DC in BC1.2 configuration.

2. The device as claimed in claim 1, wherein the configurable power source is configured to, based on the received at least one of the digital communication signal and the feedback control signal, supply corresponding power to the type-C VBUS and the type-A VBUS respectively.

3. The device as claimed in claim 2, wherein the device comprises one or more power management chips (PMIC) configured to control a power value of the type-C VBUS and the type-A VBUS to the type-C port and the type-A port, respectively.

4. The device as claimed in claim 3, wherein the configurable power source for type-C port is generated from a secondary of an AC-DC converter, wherein the one or more PMIC chips of the device are in one or more of the AC-DC converter and the DC-DC power converter.

5. The device as claimed in claim 2, wherein the DC-DC power converter operates as power source for the type-A port irrespective of Type-c port voltage.

6. The device as claimed in claim 1, wherein the type-C port comprises data terminals, and wherein the data terminals are shorted such that the second set of data terminal pins of the controller is in communication with only the first set of data terminal pins of said at least one type-A port.

7. The device as claimed in claim 1, wherein at least one of the plurality of type-A ports is connected to a sink device, wherein said detection signal is received by said controller via a general purpose input-output (GPIO) expander.

8. The device as claimed in claim 1, wherein the one or more type-A ports of the multiport universal serial bus (USB)-C based power supply device is a single type-A port, the single type-A port comprises the first set of data terminals, such that positive and negative pins of the first set of data terminals are directly connected to a second set of data terminals of the controller.

9. The device as claimed in claim 1, wherein at least one of the plurality of type-A ports is connected to a sink device, one or more signals from the first set of data terminals of the at least one of the connected type-A ports is received by the second set of data terminals of the controller using the analog multiplexer,
- wherein the first set of data terminals of remaining unconnected ones of the plurality of type-A ports are shorted through respective data terminal (DPDM) switches,
- wherein the VBUS switch is set to open for unconnected ones of the plurality of type-A ports.

10. A method for operation of a multiport universal serial bus (USB)-C based power supply device, the method comprising:
- receiving, at a controller, first information pertaining to power negotiation with a respective connected type-C external sink device to generate a type-C power profile;
- receiving, at the controller, second information pertaining to power negotiation with a respective connected type-A device to generate a type-A power profile;
- generating, at the controller, based on the generated type-C power profile and the generated type-A power profile, at least one of a digital communication signal and a feedback control signal to a configurable power source and DC-DC power converter to generate required values of a type-C VBUS and a type-A VBUS respectively; and
- operating, through the controller, a configurable control supply, based on receipt of the at least one of the digital communication signal and the feedback control signal to the configurable power source and to the DC-DC power converter, to provide the required values of the type-C VBUS and the type-A VBUS to a type-C port and the type-A port respectively,
  - wherein the controller has no other data terminal pins other than a single set of data terminal pins, that is not connected to a USB type-C port,
  - wherein the multiport universal serial bus (USB)-C based power supply device comprises a plurality of type-A ports, wherein at least one detection pin (DET) is provided on each of the plurality of type-A ports such that power supply to said at least one of the plurality of said type-A ports is established based on generation of a detection signal received by said at least one detection pin (DET),
  - wherein based on the detection signal, an analog multiplexer connected to said controller establishes a connection between said second set of data terminal pins of the controller and said first set of data terminal pins of the said at least one type-A port by controlling a VBUS switch connected to each of a plurality of type-A ports,
  - wherein, upon receipt of said detection signal from a single port of a plurality of type A-ports, said single port is supplied with power as per the power profile of the type-A port, and
  - wherein, upon receipt of said detection signal from multiple ones of the plurality of type-A ports, a first port selected from said multiple type-A ports, having a pre-determined power profile, is provided a power supply at a limited default value of 5V DC in BC1.2 configuration, followed by which power is supplied to another of said multiple ones of the plurality of type-A ports, at said default value of power 5V DC in BC1.2 configuration.

* * * * *